United States Patent
Lee et al.

(10) Patent No.: US 12,020,866 B2
(45) Date of Patent: Jun. 25, 2024

(54) MULTILAYER CERAMIC ELECTRONIC COMPONENT

(71) Applicant: SAMSUNG ELECTRO-MECHANICS CO., LTD., Suwon-si (KR)

(72) Inventors: Kyung Ryul Lee, Suwon-si (KR); Jong Suk Jeong, Suwon-si (KR); Chang Hak Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 51 days.

(21) Appl. No.: 17/576,200

(22) Filed: Jan. 14, 2022

(65) Prior Publication Data

US 2022/0301770 A1    Sep. 22, 2022

(30) Foreign Application Priority Data

Mar. 22, 2021    (KR) .................. 10-2021-0036422

(51) Int. Cl.
  *H01G 4/008*    (2006.01)
  *H01G 4/12*    (2006.01)
  *H01G 4/30*    (2006.01)

(52) U.S. Cl.
  CPC ......... *H01G 4/0085* (2013.01); *H01G 4/1227* (2013.01); *H01G 4/30* (2013.01)

(58) Field of Classification Search
  CPC ...... H01G 4/005; H01G 4/008; H01G 4/0085; H01G 4/1227; H01G 4/30
  (Continued)

(56) References Cited

U.S. PATENT DOCUMENTS 10,529,489 B1    1/2020    Kwon et al.
2004/0256603 A1*    12/2004    Celik .................. H01G 4/0085
                                                          252/500

(Continued)

FOREIGN PATENT DOCUMENTS

JP    H09-12360 A    1/1997
JP    2001-097772 A    4/2001

(Continued)

OTHER PUBLICATIONS

Y.-Y. Yeoh et al., "Defect structure and Fermi-level pinning of BaTiO3 co-doped with a variable-valence acceptor (Mn) and a fixed-valence donor (Y)," Physical Chemistry Chemical Physics, (2012), vol. 14, pp. 1642-1648.

(Continued)

*Primary Examiner* — Arun Ramaswamy
(74) *Attorney, Agent, or Firm* — Morgan, Lewis & Bockius LLP

(57) ABSTRACT

A multilayer ceramic electronic component includes: a ceramic body including a dielectric layer having a main component represented by $(Ba_{1-x}Ca_x)(Ti_{1-y}(Zr, Hf)_y)O_3$ (where, $0 \leq x \leq 1$, $0 \leq y \leq 0.5$), and including first and second internal electrodes alternately stacked with the dielectric layer interposed therebetween; a first external electrode connected to the first internal electrode; and a second external electrode connected to the second internal electrode, wherein at least one of the dielectric layer and the internal electrode includes Sn or Dy. If Sn, an average content of Sn at an interface between the dielectric layer and the internal electrode is within a range of 5 at % or more and 20 at % or less. If Dy, an average content of Dy at an interface between the dielectric layer and the internal electrode is within a range of 1 at % or more and 5 at % or less.

25 Claims, 7 Drawing Sheets

(58) Field of Classification Search
USPC ....... 361/301.4, 320, 321.1, 321.5, 303, 311, 361/312
See application file for complete search history.

(56) References Cited

U.S. PATENT DOCUMENTS

| | | | |
|---|---|---|---|
| 2005/0152095 A1* | 7/2005 | Nakano | H01G 4/1227 361/321.4 |
| 2010/0195260 A1 | 8/2010 | Ishihara | |
| 2013/0321977 A1* | 12/2013 | Lee | H01G 4/1227 361/301.4 |
| 2015/0155098 A1* | 6/2015 | Yamaguchi | H01G 13/00 156/89.16 |
| 2016/0181019 A1* | 6/2016 | Park | H01G 4/12 361/301.4 |

FOREIGN PATENT DOCUMENTS

| | | |
|---|---|---|
| JP | 2007-169088 A | 7/2007 |
| JP | 2010-173900 A | 8/2010 |
| KR | 10-2019-0121136 A | 10/2019 |

OTHER PUBLICATIONS

H.-I. Yoo, et al., "Electrocoloration and oxygen vacancy mobility of Ba Ti O3," Journal of Applied Physics, (2007), vol. 102.
C.-E. Lee et al., "Multi-Site and Multi-Ionization of Sn in the Doping of BaTiO3," Journal of American Ceramic Society, (2014), vol. 97, No. 2, pp. 513-518.

\* cited by examiner

MULTILAYER CERAMIC ELECTRONIC COMPONENT

CROSS-REFERENCE TO RELATED APPLICATION(S)

This application claims the benefit of priority to Korean Patent Application No. 10-2021-0036422 filed on Mar. 22, 2021 in the Korean Intellectual Property Office, the disclosure of which is incorporated herein by reference in its entirety.

TECHNICAL FIELD

The present disclosure relates to a multilayer ceramic electronic component.

BACKGROUND

In recent years, according to the trend for the miniaturization of electronic products, multilayer ceramic electronic components have also been required to be miniaturized and to have high capacitance. Dielectric sheets of multilayer ceramic electronic components are also becoming thinner to meet the demand for miniaturization and high capacitance in multilayer ceramic electronic components.

Meanwhile, as dielectric sheets become thinner, a size of grains of the dielectric layer, a distribution of components, and the like, are affected, such that a problem in which withstand voltage and reliability characteristics of the chip deteriorat has emerged. In order to solve the problem of deterioration of reliability, when the size of grains such as barium titanate is increased, it is difficult to secure a desired level of capacitance, and there is a limitation in guaranteeing the reliability. In addition, as the dielectric sheet becomes thinner, a magnitude of field strength per unit length applied to the dielectric layer increases, resulting in a problem in which deterioration of the dielectric occurs.

SUMMARY

An aspect of the present disclosure is to provide a multilayer ceramic electronic component having excellent high-temperature and high-pressure characteristics.

One of the various objects of the present disclosure is to improve insulation resistance characteristics of a multilayer ceramic electronic component.

An aspect of the present disclosure is to provide a multilayer ceramic electronic component having improved reliability.

According to an aspect of the present disclosure, a multilayer ceramic electronic component, includes: a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween; a first external electrode connected to the first internal electrode; and a second external electrode connected to the second internal electrode, wherein at least one of the dielectric layer and the internal electrode includes Sn, wherein an average content of Sn at an interface between the dielectric layer and the internal electrode may be within a range of 5 at % or more and 20 at % or less.

According to another aspect of the present disclosure, a multilayer ceramic electronic component, includes: a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween; a first external electrode connected to the first internal electrode; and a second external electrode connected to the second internal electrode, wherein at least one of the dielectric layer and the internal electrode includes Dy, wherein an average content of Dy at an interface between the dielectric layer and the internal electrode may be within a range of 1 at % or more and 5 at % or less.

According to another aspect of the present disclosure, a multilayer ceramic electronic component, includes a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween; a first external electrode connected to the first internal electrode; and a second external electrode connected to the second internal electrode. The internal electrode comprises Sn, wherein an average content of Sn in the internal electrode is within a range of 0.05 at % or more and 2 at % or less.

According to another aspect of the present disclosure, a multilayer ceramic electronic component, includes a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween; a first external electrode connected to the first internal electrode; and a second external electrode connected to the second internal electrode. The internal electrode comprises Dy, an average content of Dy in the internal electrode is within a range of 0.025 at % or more and 1 at % or less.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
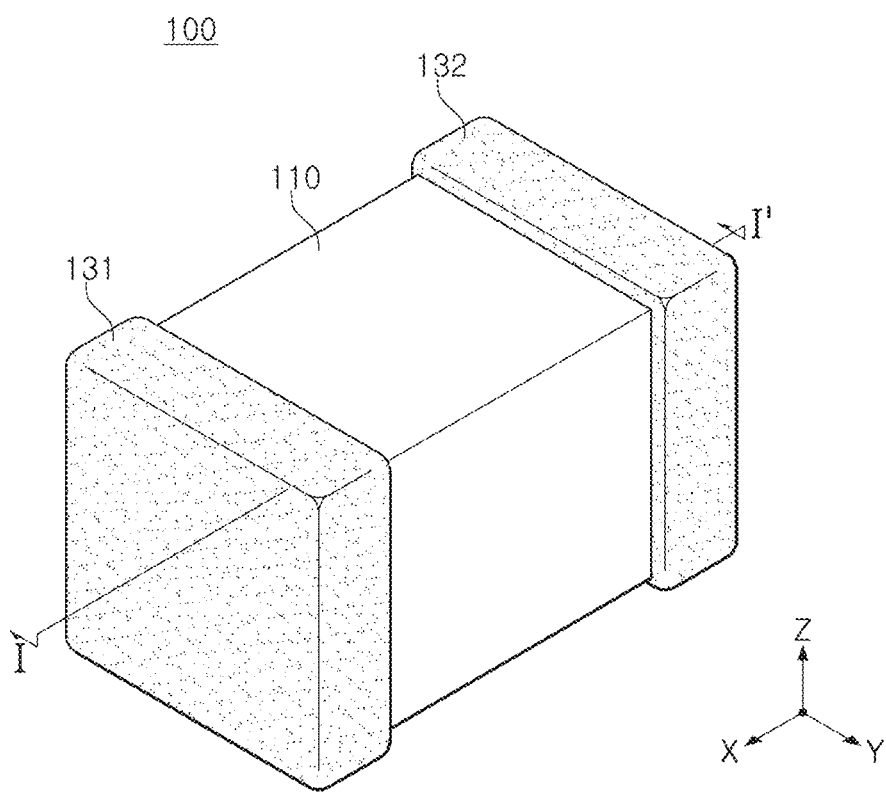
FIG. 1 is a perspective view schematically illustrating a multilayer ceramic electronic component according to an embodiment of the present disclosure.

Hereinafter, embodiments of the present disclosure will be described as follows with reference to the attached drawings. It is not intended to limit the techniques described herein to specific embodiments, and it should be understood to include various modifications, equivalents, and/or alternatives to the embodiments of the present disclosure. In connection with the description of the drawings, similar reference numerals may be used for similar components.

In the drawings, for clarity of description, parts irrelevant to the description may be omitted, and thicknesses of elements may be magnified to clearly represent layers and regions. Components having the same functions within a scope of the same idea may be described using the same reference numerals.

In the present specification, expressions such as "having", "may have", "include" or "may include" may indicate a presence of corresponding features (e.g., components such as numerical values, functions, operations, components, or the like), and may not exclude a presence of additional features.

In the present specification, expressions such as "A or B", "at least one of A or/and B" or "one or more of A or/and B", and the like, may include all possible combinations of items listed together. For example, "A or B", or "at least one of A or B" may refer to all cases including (1) at least one A (2) at least one B, or (3) both at least one A and at least one B.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Figure 2:
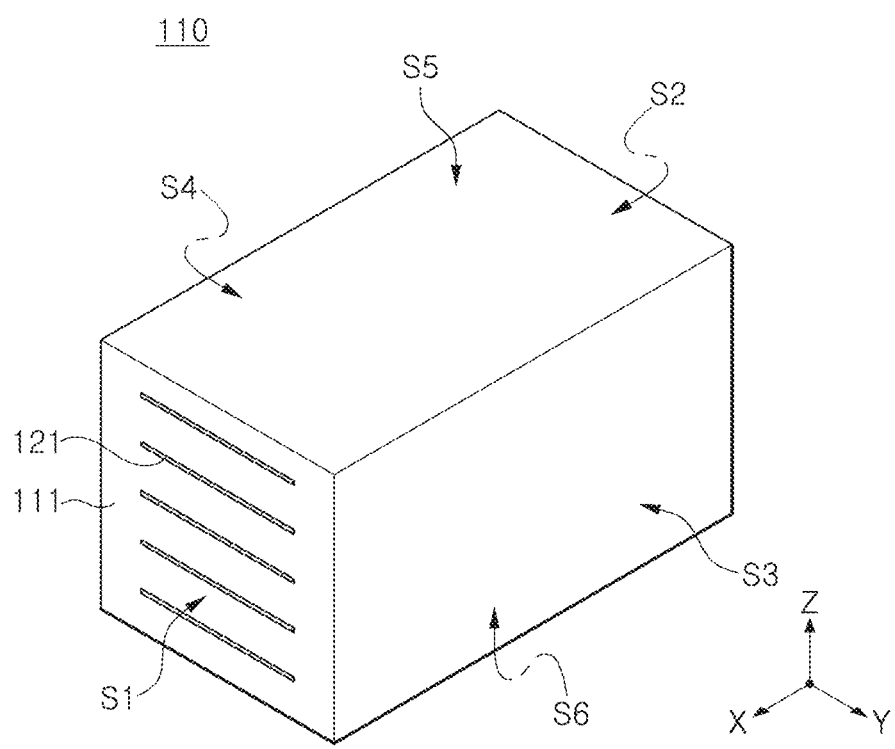
FIG. 2 is a perspective view schematically illustrating the ceramic body of FIG. 1.
Figure 3:
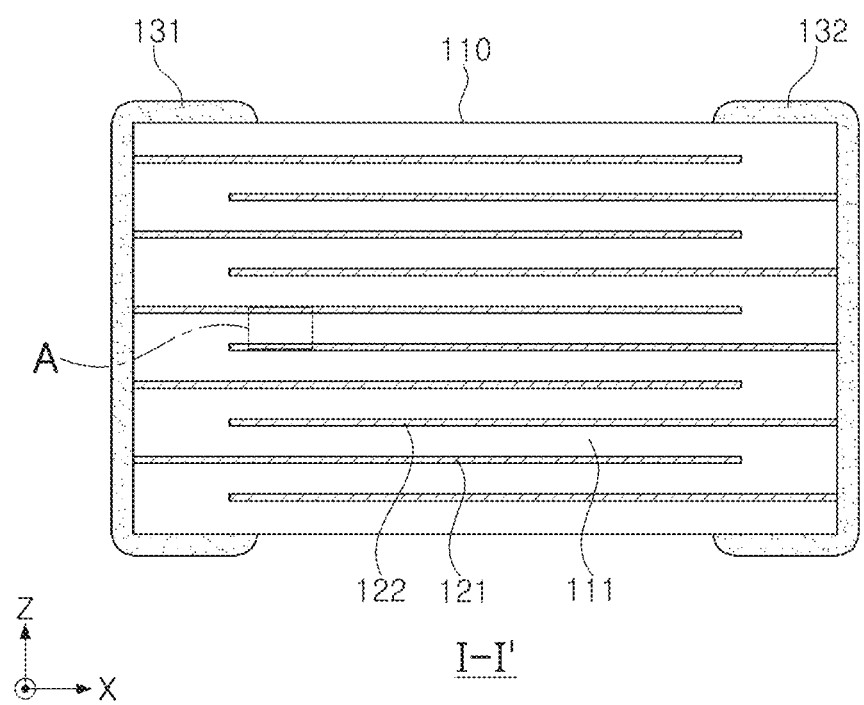
FIG. 3 is a cross-sectional view taken along line I-I' of FIG. 1.
Figure 4:
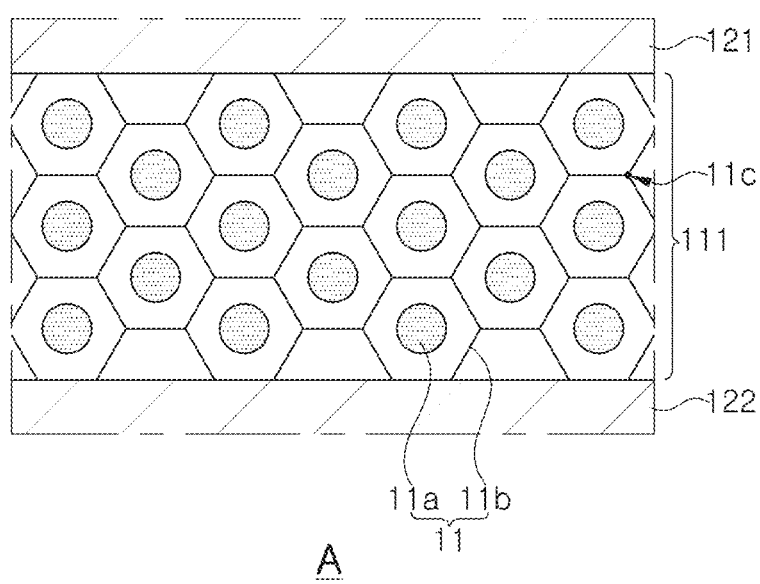
FIG. 4 is an enlarged view of area A of FIG. 3.

FIG. 1 is a schematic perspective view of a multilayer ceramic electronic component according to an embodiment of the present disclosure, FIG. 2 is a perspective view of a ceramic body of the multilayer ceramic electronic component, and FIG. 3 is a cross-sectional view taken along line I-I' of FIG. 1. In addition, FIG. 4 is an enlarged view of area A of FIG. 3.

Hereinafter, a multilayer ceramic electronic component according to an embodiment of the present disclosure will be described in detail with reference to FIGS. 1 to 4.

Referring to FIGS. 1 to 4, a multilayer ceramic electronic component according to an embodiment of the present disclosure may include a ceramic body including a dielectric layer having a main component represented by $(Ba_{1-x}Ca_x)(Ti_{1-y}(Zr, Hf)_y)O_3$ (where, $0 \leq x \leq 1$, $0 \leq y \leq 0.5$), and including first and second internal electrodes alternately stacked with the dielectric layer interposed therebetween; a first external electrode connected to the first internal electrode; and a second external electrode connected to the second internal electrode.

In this case, any one of the dielectric layer and the internal electrode includes Sn, an average content of Sn at an interface between the dielectric layer and the internal electrode may be within a range of 5 at % or more or and 20 at % or less. In the present specification, "average content" of a component may refer to an arithmetic mean of the contents of samples collected from 10 different positions, and may be obtained from an arithmetic mean of the contents measured at five upper and lower interfaces in an order close to a center of the multilayer ceramic electronic component with respect to an X-Z cut plane passing through a center of the ceramic body 110 of the multilayer ceramic electronic component 100 and perpendicular to an Y-axis.

In the present specification, a term "interface" of the dielectric layer 111 and the first internal electrode 121 and/or the second internal electrode 122 may refer to a surface in which the dielectric layer and the internal electrode are in contact, and a surface that can be observed through an scanning electron microscope (SEM) image, or the like. In addition, the interface may refer to a surface in which two surfaces having different constituent components are in contact with each other, and may refer to a surface that can be identified through distribution of major components of the dielectric layer and the internal electrode.

Figure 5A:
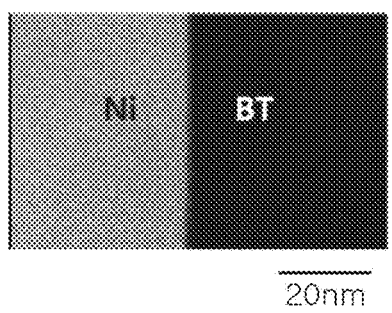
FIGS. 5(a)-5(c) are an energy dispersive spectroscopy (EDS) mapping image for Ni(a), $BiTO_3$ (a), Sn(b), and Dy(c) at an interface between an internal electrode and a dielectric according to an embodiment of the present disclosure.
Figure 6:
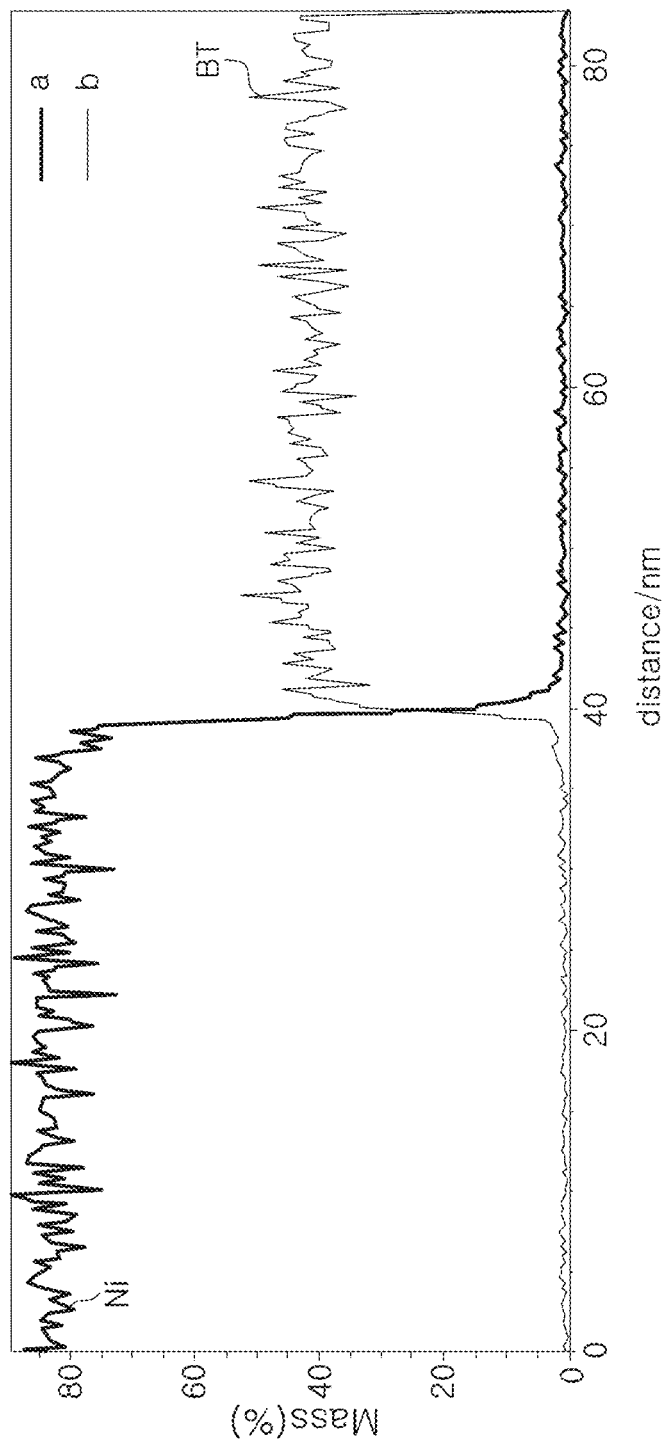
FIG. 6 is a graph illustrating results of line profiling of Ni (a) and $BiTO_3$ (b) for energy dispersive spectroscopy (EDS) mapping at an interface between the internal electrode and dielectric of FIGS. 5(a)-5(c)

For example, referring to FIG. 5(a) and FIG. 6, it can be seen that the content of Ba and Ti is not detected from a predetermined position, and the content of Ni is detected from passing the predetermined position. Thereby, it can be confirmed that a region in which Ba and Ti are distributed and a region in which Ni is distributed are clearly distinguished, and a region in which the contents of Ba and Ni rapidly change can be interpreted as an interface between the dielectric layer and the internal electrode.

Figure 5B:
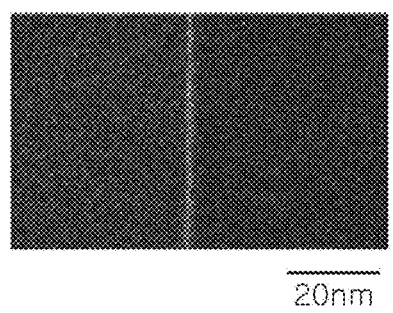
Figure 7:
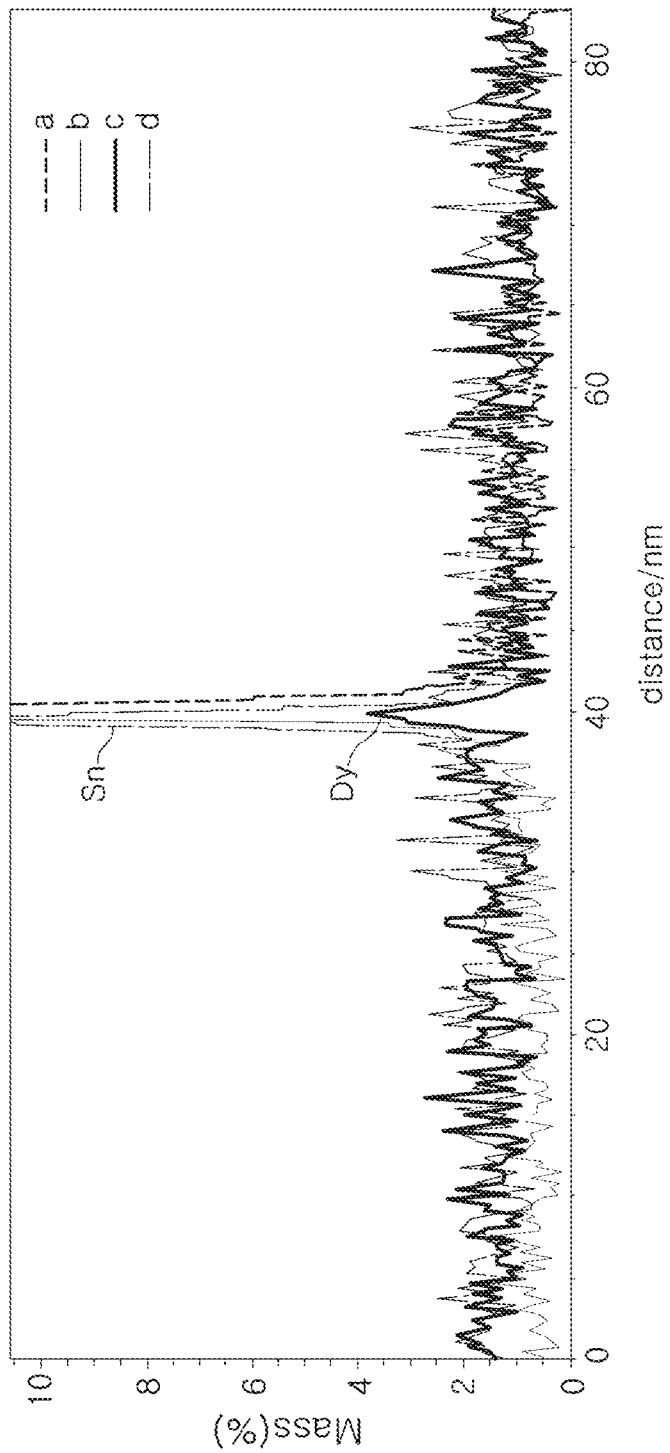
FIG. 7 is a graph illustrating results of line profiling of Ni(a), $BiTO_3$ (b), Dy(c), and Sn(d) for energy dispersive spectroscopy (EDS) mapping at an interface between the internal electrode and dielectric of FIGS. 5(a)-5(c).

In addition, FIG. 5(b) exhibits a result of energy dispersive spectroscopy (EDS) mapping for Sn at the interface between the internal electrode and the dielectric, and FIG. 7 is a graph illustrating a result of line profiling of Ni(a), $BiTO_3$(b), Dy(c), and Sn(d) for EDS mapping of FIG. 5(b). Referring to FIG. 5(b) and FIG. 7, a peak having a maximum content of Sn may be located in a region in which the internal electrode and the dielectric meet, and when the peak is connected, it can be observed as a single line. A line connecting the peak of the content of Sn may also be interpreted as an interface between the dielectric layer and the internal electrode.

In a dielectric layer having a thin thickness, mobility of electric charges can be lowered by using a potential barrier at the interface therebetween by increasing a fraction of grain boundaries. To this end, in order to increase the fraction of grain boundaries, dielectrics having small grain distributions have been studied. However, as the thickness of the dielectric decreases, electric field strength increases rapidly, and a phenomenon in which a Schottky barrier decreases relatively often occurs. For this reason, it is difficult to ensure the reliability of the dielectric in an ultra-thin layer environment only by controlling grain distribution.

In addition, as the thickness of the dielectric layer decreases, the number of stacked dielectric layers increases, and the number of interfaces between the dielectric and internal electrodes increases. In this case, a large change occurs in the characteristics of the entire multilayer ceramic electronic component due to the interface characteristics, and the characteristics and reliability of the product vary greatly depending on how an interface portion is designed and controlled. Accordingly, the present inventors have found that it is possible to suppress the movement of oxygen vacancy, which is a major deterioration mechanism of reliability, by controlling the characteristics of the interface between the dielectric layer and the internal electrode. In the present specification, "oxygen vacancy" refers to a void caused by the escape of oxygen in a place in which oxygen should exist in a certain compound. For example, when barium titanate ($BaTiO_3$) having a perovskite structure ($ABO_3$) is sintered in a reducing atmosphere, some of the oxygen contained in the barium titanate ($BaTiO_3$) is reduced and oxygen is separated from the barium titanate ($BaTiO_3$). In this case, a void where oxygen is released becomes an oxygen vacancy having ionic conductivity. Since such oxygen vacancies cause deterioration of electrical characteristics such as a decrease in insulation properties, it is important to suppress the generation of oxygen vacancies in a multilayer ceramic electronic component having a thin thickness.

In the multilayer ceramic electronic component according to the present embodiment, in a dielectric layer having a perovskite ($ABO_3$), the distribution of Sn may be controlled to suppress movement of oxygen vacancies. In particular, when the content at the interface between the dielectric layer and the internal electrode satisfies the above-described range, excellent reliability may be implemented by adjusting a balance between a donor and an acceptor.

In another embodiment of the present disclosure, at least one of the dielectric layer and the internal electrode of the multilayer ceramic electronic component may include Dy, and an average content of Dy at the interface between the dielectric layer and the internal electrode may be within a range of 1 at % or more and 5 at % or less. In general, when a rare earth element is substituted at the A site, the rare earth element tends to act as a donor, and when the rare earth element is substituted at the B site, the rare earth element tends to act as an acceptor. In this case, an important factor in determining which position of the A site and/or the B site is to be substituted is an ionic radius. Dy is a representative amphoteric element among rare earth elements, and may be selectively substituted at the A site or the B site to balance the acceptor and the donor. When the content of Dy at the interface between the dielectric layer and the internal electrode satisfies the above range, a movement of oxygen vacancy can be effectively suppressed.

In one example, at any one of the dielectric layer and the internal electrode of the multilayer ceramic electronic component includes Sn and Dy, and an average content of Sn at an interface between the dielectric layer and the internal electrode may be within a range of 5 at % or more and 20 at % or less. That is, it is possible to have a configuration simultaneously satisfying the two embodiments described above. In this case, a further excellent reliability improvement effect can be obtained.

The multilayer ceramic electronic component 100 according to an embodiment of the present disclosure may include a ceramic body 110 including a dielectric layer 111, and first and second internal electrodes 121 and 122 alternately stacked with the dielectric layer 111 interposed therebetween.

The ceramic body 110 may include first and second surfaces S1 and S2 opposing in a first direction (X direction), third and fourth surfaces S3 and S4 opposing in a second direction (Y direction), and fifth and sixth surfaces S5 and S6 opposing in a third direction (Z direction).

There is no particular limitation on the specific shape of the ceramic body 110, but as shown, the ceramic body 110 may have a hexahedral shape or a similar shape. Due to shrinkage of the ceramic powder included in the ceramic body 110 during a sintering process, the ceramic body 110 may have a substantially hexahedral shape although not a hexahedral shape having a completely straight line. If necessary, the ceramic body 110 may be rounding processed so that corners are not angled. The rounding process may use, for example, barrel polishing, but is not limited thereto.

In the ceramic body 110, a dielectric layer 111, a first internal electrode 121, and a second internal electrode 122 may be alternately stacked. The dielectric layer 111, the first internal electrode 121, and the second internal electrode 122 may be stacked in a third direction (Z direction). The plurality of dielectric layers 111 are in a sintered state, a boundary between the adjacent dielectric layers 111 may be integrated to such an extent that it is difficult to determine without using a scanning electron microscope (SEM).

The dielectric layer 111 of the multilayer ceramic electronic component 100 according to the present disclosure may include a component represented by $(Ba_{1-x}Ca_x)(Ti_{1-y}(Zr, Sn, Hf)_{3-y})O_3$ (where, $0 \leq x \leq 1$, $0 \leq y \leq 0.5$). The component may be, for example, a chemical in which Ca, Zr, Sn and/or Hf are partially dissolved in $BaTiO_3$. In the above compositional formula, x may be in a range of 0 or more and 1 or less, and y may be in a range of 0 or more and 0.5 or less, but is not limited thereto. For example, when x is 0, y is 0, and z is 0 in the above compositional formula, the main component may be $BaTiO_3$. In addition, various ceramic additives, organic solvents, plasticizers, binders, dispersants, and the like may be added to the above components according to the purpose of the present disclosure.

In one example, an average thickness of the first and second internal electrodes 121 and 122 of the multilayer ceramic electronic component 100 may be 0.5 μm or less. The average thickness of the internal electrode may be an average of values measured at five different positions of the sintered internal electrode. A lower limit of the average thickness of the first and second internal electrodes is not particularly limited, but may be, for example, 0.01 um or more.

The dielectric layer 111 may be formed by adding an additive to a slurry containing the above-described material, and applying and drying the same on a carrier film to prepare a plurality of ceramic sheets. The ceramic sheet may be formed by manufacturing the slurry in a sheet shape having a thickness of several μms by a doctor blade method, but is not limited thereto.

In one example of the present disclosure, the first and second internal electrodes 121 and 122 of the multilayer ceramic electronic component 100 may be stacked so that respective cross-sections thereof are exposed to opposite both end portions of the ceramic body 110, respectively. Specifically, the first and second internal electrodes 121 and 122 may be exposed to both surfaces of the ceramic body 110 in a first direction (X direction), respectively, and the first internal electrode 121 may be exposed in a first surface S1 direction of the ceramic body 110, and the second internal electrode 122 may be exposed in a second surface S2 direction thereof.

In one example, an average thickness of the first and second internal electrodes 121 and 122 of the multilayer ceramic electronic component 100 may be 0.4 μm or less. The average thickness of the internal electrode may be an average of values measured at five different positions of the sintered internal electrode. A lower limit of the average thickness of the first and second internal electrodes is not particularly limited, but may be, for example, 0.01 um or more.

A material of the first and second internal electrodes 121 and 122 may not be limited to any particular material, and may be formed using a conductive paste including one or more conductive metals from among silver (Ag), palladium (Pd), gold (Au), platinum (Pt), nickel (Ni), copper (Cu), tin (Sn), tungsten (W), titanium (Ti), and alloys thereof.

The ceramic body 110 may be formed by alternately laminating a ceramic green sheet on which the first internal electrode 121 is printed and a ceramic green sheet on which the second internal electrode 122 is printed on the dielectric layer third direction (Z direction). As a method of printing the first and second internal electrodes 121 and 122, a screen-printing method, a gravure printing method, or the like, may be used, but the printing method is not limited thereto.

Sn and/or Dy described above may be included in at least one of the dielectric layer and the internal electrode. When the Sn and/or Dy is included in the dielectric layer, this may be obtained by adding Sn and/or Dy to a manufacturing process of the ceramic green sheet for manufacturing the dielectric layer. In addition, when the Sn and/or Dy is included in the internal electrode, this may be obtained by adding the Sn and/or Dy to a manufacturing process of a conductive paste for manufacturing the internal electrode.

In one example, Sn and/or Dy of the multilayer ceramic electronic component may be included in both the dielectric layer and the internal electrode. In this case, a reaction time with barium titanate, or the like, which is a main component of the dielectric layer, may be minimized while Dy, which is mainly distributed in a shell part and/or grain boundaries of the dielectric layer, and Sn, which is relatively difficult to be diffused into the shell part, is extruded during the sintering step, such that the thickness of the interface between the dielectric layer and internal electrodes may be minimized.

In an embodiment of the present disclosure, an average thickness of the interface between the dielectric layer and the internal electrode of the multilayer ceramic electronic component may be within a range of 2 nm or more and 4 nm or less. In the present specification, "thickness" may refer to a distance to the other surface measured in a direction, perpendicular to one surface of the interface, and "average thickness" may be a value measured at a location in which the above-described average content is obtained. For example, with respect to a X-Z cut plane passing through a center of the ceramic body 110 of the multilayer ceramic electronic component 100 and perpendicular to a Y axis, and may be obtained as an arithmetic mean of the thickness of the interface measured at five upper and lower interfaces in an order from the center of the multilayer ceramic electronic component.

In the ceramic electronic component according to the present disclosure, as described above, Sn and/or Dy may be included in a predetermined content range at an interface between the dielectric layer and the internal electrode. In this case, the interface including Sn and/or Dy may improve reliability of the product, but the content of Sn and/or Dy is high, so a dielectric constant may be lowered. Accordingly, in the multilayer ceramic electronic component of the present embodiment, reliability can be improved without deterioration of dielectric properties by adjusting the thickness of the interface between the dielectric layer containing Sn and/or Dy and the internal electrode within the above range.

In one example of the present disclosure, an average content of Sn in the internal electrode of the multilayer ceramic electronic component may be within a range of 0.05 at % or more and 2 at % or less. In the present example, the internal electrode may include Sn, and Sn may be squeezed out to the interface between the dielectric layer and the internal electrode, and at the same time, the above range may be satisfied while the average content of Sn in the internal electrode is lower than that of Sn at the interface therebetween. The average content may be a value measured at a central portion of the internal electrode adjacent to the measurement position of the average content. When Sn included in the internal electrode satisfies the above content range, the interface between the dielectric layer and the internal electrode may be formed to be thin.

In another example of the present disclosure, an average content of Dy in an internal electrode may be within a range of 0.025 at % or more and 1 at % or less. As in the case of Sn, a region having a maximum content of Dy, may be disposed at an interface between the dielectric layer and the internal electrode, and the content of Dy included in the internal electrode may be lower than the content at the interface. When Dy included in the internal electrode satisfies the above content range, the interface between the dielectric layer and the internal electrode can be formed to be thin without deteriorating electrical characteristics.

In an embodiment of the present disclosure, the dielectric layer and/or the internal electrode of the multilayer ceramic electronic component may include Sn, and a region in the dielectric layer and/or the internal electrode, having a maximum content of Sn, may be disposed at the interface between the dielectric layer and the internal electrode. The fact that the region in the dielectric layer and/or the internal electrode, having a maximum Sn content, is disposed at the interface between the dielectric layer and the internal electrode, may mean that the average content of Sn is decreased as a distance from the interface between the dielectric layer and the internal electrode increases, and may mean that the average content of Sn at a position spaced apart from the interface between the dielectric layer 111 and the first internal electrode 121 and/or the second internal electrode 122 is lower than that of the interface. FIG. 5(b) is an energy dispersive spectroscopy (EDS) mapping image for Sn, and FIG. 7 is a graph illustrating a line profiling result for the mapping result. Referring to FIG. 5(b) and FIG. 7, a region having a maximum Sn content may be disposed at an interface between the dielectric layer and the internal electrode. When the region having a maximum Sn content is disposed at the interface between the dielectric layer and the internal electrode, reliability may be improved without deteriorating electrical characteristics of the multilayer ceramic electronic component.

In the above-described embodiment, a maximum value of the Sn content at the interface between the dielectric layer and the internal electrode of the multilayer ceramic electronic component according to the present disclosure may be within a range of 10 at % or more and 20 at % or less. The maximum value of the Sn content may be a value measured at the same position as the position at which the average content is measured.

Figure 5C:
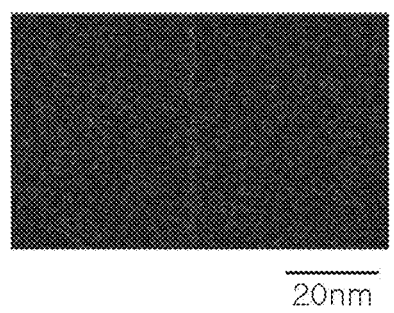

In one example, a dielectric layer and/or an internal electrode of the multilayer ceramic electronic component includes Dy, and a region in the dielectric layer and/or the internal electrode, having a maximum content of Dy, may be disposed at the interface between the dielectric layer and the internal electrode. The fact that the region in the dielectric layer and/or the internal electrode, having a maximum content of Dy, is disposed at the interface between the dielectric layer and the internal electrode, may mean that an average content of Dy is decreased as a distance from the interface between the dielectric layer and the internal electrode decreases, and may mean that an average content of Dy at a position spaced apart from the interface between the dielectric layer 111 and the first internal electrode 121 and/or the second internal electrode 122 is lower than that of the interface. FIG. 5(c) is an energy dispersive spectroscopy (EDS) mapping image for Dy, and FIG. 7 is a graph illustrating a line profiling result for the mapping result. Referring to FIG. 5(c) and FIG. 7, a region having a maximum content of Dy may be disposed at an interface between the dielectric layer and the internal electrode. When the region having a maximum content of Dy is disposed at an interface between the dielectric layer and the internal electrode, withstand voltage characteristics of the multilayer ceramic electronic component may be improved.

In the above-described example, a maximum value of the Dy content at the interface between the dielectric layer and the internal electrode of the multilayer ceramic electronic component according to the present disclosure may be within a range of 2 at % or more and 5 at % or less. The maximum value of the content of Dy may be a value measured at the same position as the position at which the average content is measured.

In an embodiment of the present disclosure, the dielectric layer and/or the internal electrode of the multilayer ceramic electronic component may include Sn and Dy, and a ratio (Sn/Dy) of the content of Sn to the content of Dy at the interface between the dielectric layer and the internal electrode may be 2 or more. The ratio (Sn/Dy) may be 2.0 or more, 2.1 or more, 2.2 or more, 2.3 or more, 2.4 or more, or 2.5 or more, but is not limited thereto.

In another embodiment of the present disclosure, the dielectric layer and/or the internal electrode of the multilayer ceramic electronic component may include Sn and Dy, and a ratio (Sn/Dy) of the content of Sn to the content of Dy at the interface between the dielectric layer and the internal electrode may be 4 or less. The ratio (Sn/Dy) may be 4.0 or less, 3.9 or less, 3.8 or less, 3.7 or less, 3.6 or less, or 3.5 or less, but is not limited thereto.

When the ratio (Sn/Dy) of the content of Sn to the content of Dy at the interface between the dielectric layer and the internal electrode of the multilayer ceramic electronic component according to the present disclosure satisfies the above range, Sn and Dy may be substituted at an appropriate ration at an A site and a B site, and thereby, a Fermi level pinning effect in which a Fermi level and Ei have similar values may be obtained, and the reliability of the multilayer ceramic electronic component can be improved.

In the multilayer ceramic electronic component 100 according to the present disclosure, a first external electrode 131 and a second external electrode 132 may be disposed on an outer surface of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 110.

In one example, at least a portion of the first external electrode 131 of the multilayer ceramic electronic component 100 according to the present disclosure may be disposed to extend on the third surface S3, the fourth surface S4, the fifth surface S5, and the sixth surface S6 of the ceramic body 110. In addition, at least a portion of the second external electrode 132 may be disposed to extend on the third surface S3, the fourth surface S4, the fifth surface S5, and the sixth surface S6 of the ceramic body 110. In this case the first external electrode 131 and the second external electrode 132 may be disposed to be spaced apart from each other. When at least a portion of the first external electrode 131 and/or the second external electrode 132 is disposed to extend on the third surface S3, the fourth surface S4, the fifth surface S5, and the sixth surface S6 of the ceramic body 110, respectively, the extended portion may function as a so-called band portion, and the reliability of the multilayer ceramic electronic component 100 according to the present disclosure may be further improved by preventing moisture penetration, or the like.

In an embodiment of the present disclosure, the first external electrode 131 and the second external electrode 132 of the multilayer ceramic capacitor 100 may be sintered electrodes containing a conductive metal. The conductive metal may include one or more of copper (Cu), nickel (Ni), tin (Sn), palladium (Pd), platinum (Pt), iron (Fe), gold (Au), silver (Ag), tungsten (W), titanium (Ti), lead (Pb), and alloys thereof.

In addition, the first external electrode 131 and the second external electrode 132 may include glass. The glass may be a composition in which oxides are mixed, and may not be particularly limited, but may be one or more selected from a group consisting of a silicon oxide, a boron oxide, an aluminum oxide, a transition metal oxide, an alkali metal oxide, and an alkaline earth metal oxide. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na) and potassium (K), and the alkaline earth metal may be one or more selected from a group consisting of magnesium (Mg), calcium (Ca), strontium (Sr), and barium (Ba).

As an example of a method of forming the first electrode layer 131 and the second electrode layer 132, the first electrode layer 131 and the second electrode layer 132 may be formed by dipping a ceramic body 110 into a conductive paste containing conductive metal and then sintering the same, or formed by printing the conductive paste on the surface of the ceramic body 110 by a screen printing method or a gravure printing method and sintering the same. In addition, the first electrode layer 131 and the second electrode layer 132 may be formed by applying the conductive paste to the surface of the ceramic body or transferring a dried film obtained by drying the conductive paste onto the ceramic body and then sintering the same, but is not limited thereto. For example, it may be formed by a conductive paste on a ceramic body 110 and then sintering the same by various methods other than the above-described methods.

In another embodiment of the present disclosure, the first and second external electrodes 131 and 132 of the multilayer ceramic electronic component 100 may be resin-based electrodes including a conductivity imparting agent and a base resin. The resin-based electrode has a structure in which a conductivity imparting agent is dispersed in the base resin, and may be manufactured in an environment at a lower temperature than the sintered electrode, so that the conductivity imparting agent may exist inside the base resin in the form of particles. When the first and second external electrodes 131c and 132c are resin-based electrodes, physical stress such as external impact may be blocked.

The conductivity imparting agent may include conductive metal and/or a conductive polymer. The conductivity imparting agent may be, for example, one or more selected from a group consisting of calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), alloys thereof, but an embodiment thereof is not limited thereto.

Also, examples of the conductive polymer may include, although not limited thereto, PT (poly(thiophene)), PEDOT (poly(ethylenedioxy) thiophene), PPS (poly(p-phenylene sulfide)), PANI (polyanilines), P3HT (poly(3-hexylthiophene-2,5-diyl)), PolyTPD (poly(4-butylphenyldiphenylamine)), PSS (poly(4-butylphenyldiphenylamine)), PVK (poly(9-vinylcarbazole)), PDBT (poly(4,4'-dimethoxy bithophene)), sulfur (S) and/or nitrogen (N)-containing compounds such as polypyrrole or polyaniline, and also include compounds including no hetero atom such as poly(fluorine), polyphenylene, polypyrene, polyazulene, polynaphthalene, PAC (poly(acetylene)), PPV (poly(p-phenylene vinylene), or the like, but an embodiment thereof is not limited thereto.

The first and second electrode layers 131 and 132 may include a conductive pillar such as carbon fillers such as carbon nanotubes, graphene, fullerene, and/or alloy fillers such as spherical-type, elliptical-type, flake-type, fibrous-type, or resinous (dendrite-type) as necessary, but is not limited thereto.

The base resin included in the first and second electrode layers 131 and 132 may be, for example, a thermosetting resin. Specific examples of the thermosetting resin may include a phenol resin, an urea resin, a diallylphthalate resin, a melanin resin, a guanamine resin, an unsaturated a polyester resin, a polyurethane resin, an epoxy resin, an aminoalkyd resin, a melamine-urea cocondensation resin, a silicon resin, a polysiloxane resin, and the like, but are not limited thereto. When a thermosetting resin is used, a crosslinking agent, a curing agent such as a polymerization initiator, a polymerization accelerator, a solvent, a viscosity modifier, and the like may be further added and used as necessary.

<Experimental Example>

A high accelerated lift test (HALT) was conducted using a mass-produced chip (temperature characteristics of X7R and a capacity of 220.0 nF) having a 1005 size (length× width: 1.0 mm×0.5 mm) from Samsung Electro-Mechanics having external electrodes formed on a surface of the ceramic body in a length direction. The chips used in the test were chips using Sn and Dy for both sides of the dielectric layer and the internal electrode, and chips manufactured under the same conditions were used, except that contents of Sn and Dy were different. The contents of Sn and Dy were measured at 10 measurement points to obtain the above-described average content, and peak values of Sn and Dy were the maximum values among the values measured at the measurement points.

In addition, an average value of Sn and Dy was obtained using the contents of Sn and Dy at the 10 measurement points. A method for obtaining the average content of Sn and Dy is as follows. ① First, a point at which Sn has a peak value at the measurement point was assumed as an interface between an internal electrode and a dielectric layer. ② An arithmetic mean value of the content of Sn and Dy in a region within 2 nm on both sides from the interface was obtained. The arithmetic mean value was obtained from a result of line profiling for energy dispersive spectroscopy (EDS) mapping. ③ An average content of Sn and Dy was obtained from the arithmetic mean values of Sn and Dy obtained at the 10 measurement points.

TABLE 1

| Sn average (unit: at %) | Sn peak (unit: at %) | Dy average (unit: at %) | Dy peak (unit: at %) | HALT fail (unit: numbers) |
|---|---|---|---|---|
| 2.60 | 4.00 | 0.63 | 1.20 | 18/400 |
| 2.83 | 4.30 | 0.68 | 1.30 | 22/400 |
| 3.20 | 7.20 | 0.90 | 1.70 | 7/400 |
| 4.80 | 8.00 | 1.20 | 2.10 | 3/400 |
| 5.04 | 8.40 | 1.10 | 2.00 | 0/400 |
| 5.30 | 9.40 | 1.30 | 2.30 | 1/400 |
| 6.60 | 11.00 | 1.43 | 2.60 | 0/400 |
| 7.86 | 13.10 | 1.65 | 3.00 | 0/400 |
| 10.30 | 16.30 | 2.60 | 3.80 | 0/400 |
| 13.26 | 22.10 | 3.13 | 5.70 | 0/400 |
| 14.10 | 20.40 | 3.04 | 4.50 | 1/400 |

In the high accelerated lift test (HALT), the number of defects occurred among 400 samples was measured after being maintained at a temperature of 130° C. and 2×Vr (rated voltage) for 100 hours.

Table 1 shows HALT test results for the peak values and average values of the contents of Sn and Dy. As shown in Table 1, when an average content of Sn at an interface between the internal electrode and the dielectric layer is lower than 5 at %, it can be seen that defects increase rapidly in the HALT test. In addition, when the average content of Dy is lower than 1 at %, it can be seen that a defect rate increases. Referring to the content of Sn and Dy in FIG. 7, it can be seen that an average content of Sn is observed in a range of about 20 at % or less, and an average content of Dy is observed in a range of about 5 at % or less. Therefore, when the average content of Dy at the interface between the internal electrode and the dielectric layer falls within a range of 5 at % or more and 20 at % or less, it can be confirmed that it has excellent high-temperature reliability, and when the average content of Dy at the interface between the internal electrode and the dielectric layer satisfies a range of 1 at % or more and 5 at % or less, it can be confirmed that a low defect rate is shown.

As set forth above, according to one of the various effects of the present disclosure, high-temperature and high-pressure characteristics of a multilayer ceramic electronic component may be improved.

One of the various effects of the present disclosure is to improve insulation resistance characteristics of a multilayer ceramic electronic component.

One of the various effects of the present disclosure is to improve reliability of a multilayer ceramic electronic component.

However, various and advantageous advantages and effects of the present invention are not limited to the above description, and will be more readily understood in the process of describing specific embodiments of the present invention.

While the embodiments have been illustrated and described above, it will be apparent to those skilled in the art that modifications and variations could be made without departing from the scope in the embodiment as defined by the appended claims.

What is claimed is:

1. A multilayer ceramic electronic component, comprising:
a ceramic body including a dielectric layer having a main component represented by $(Ba_{1-x}Ca_x)(Ti_{1-y}(Zr, Hf)_y)O_3$ (where, $0 \leq x \leq 1$, $0 \leq y \leq 0.5$), and including first and second internal electrodes alternately stacked with the dielectric layer interposed therebetween;
a first external electrode connected to the first internal electrode; and
a second external electrode connected to the second internal electrode,
wherein at least one of the dielectric layer and the internal electrode comprises Sn and Dy,
wherein an average content of Sn at an interface between the dielectric layer and the internal electrode is in a range of 5 at % or more and 20 at % or less, and
wherein a ratio (Sn/Dy) of a content of Sn to a content of Dy at an interface between the dielectric layer and the internal electrode satisfies a range of 2 or more.

2. The multilayer ceramic electronic component of claim 1, wherein both the dielectric layer and the internal electrode comprise Sn.

3. The multilayer ceramic electronic component of claim 2, wherein an average content of Sn in the internal electrode is within a range of 0.05 at % or more and 2 at % or less.

4. The multilayer ceramic electronic component of claim 1, wherein a region in the ceramic body, having a maximum content of Sn, is disposed at an interface between the dielectric layer and the internal electrode.

5. The multilayer ceramic electronic component of claim 1, wherein an average content of Dy at an interface between the dielectric layer and the internal electrode is within a range of 1 at % or more and 5 at % or less.

6. The multilayer ceramic electronic component of claim 5, wherein both the dielectric layer and the internal electrode comprise Dy.

7. The multilayer ceramic electronic component of claim 6, wherein an average content of Dy in the internal electrode is within a range of 0.025 at % or more and 1 at % or less.

8. The multilayer ceramic electronic component of claim 5, wherein a region in the ceramic body, having a maximum content of Dy, is disposed at an interface between the dielectric layer and the internal electrode.

9. The multilayer ceramic electronic component of claim 1, wherein an average thickness of an interface between the dielectric layer and the internal electrode is within a range of 2 nm or more and 4 nm or less.

10. The multilayer ceramic electronic component of claim 1, wherein the dielectric layer has an average thickness of 0.5 µm or less.

11. The multilayer ceramic electronic component of claim 1, wherein at least one of the first internal electrode and the second internal electrode has an average thickness of 0.4 µm or less.

12. A multilayer ceramic electronic component, comprising:
a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween;
a first external electrode connected to the first internal electrode; and
a second external electrode connected to the second internal electrode,
wherein at least one of the dielectric layer and the internal electrode comprises Sn and Dy,
wherein an average content of Sn at an interface between the dielectric layer and the internal electrode is in a range of 5 at % or more and 20 at % or less, and
wherein a ratio (Sn/Dy) of a content of Sn to a content of Dy at an interface between the dielectric layer and the internal electrode satisfies a range of 4 or less.

13. A multilayer ceramic electronic component, comprising:
a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately with the dielectric layer interposed therebetween;
a first external electrode connected to the first internal electrode; and
a second external electrode connected to the second internal electrode,
wherein at least one of the dielectric layer and the internal electrode comprises Dy,
wherein an average content of Dy at an interface between the dielectric layer and the internal electrode is within a range of 1 at % or more and 5 at % or less,
wherein region with maximum content Dy is arranged at the interface of the dielectric layer and the internal electrode.

14. The multilayer ceramic electronic component of claim 13, wherein both the dielectric layer and the internal electrode comprise Dy.

15. The multilayer ceramic electronic component of claim 14, wherein an average content of Dy in the internal electrode is within a range of 0.025 at % or more and 1 at % or less.

16. A multilayer ceramic electronic component, comprising:
a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween;
a first external electrode connected to the first internal electrode; and
a second external electrode connected to the second internal electrode,
wherein the internal electrode comprises Sn, wherein an average content of Sn in the internal electrode is within a range of 0.05 at % or more and 2 at % or less,
wherein at least one of the dielectric layer and the internal electrode comprises Dy, and
wherein a ratio (Sn/Dy) of a content of Sn to a content of Dy at an interface between the dielectric layer and the internal electrode satisfies a range of 4 or less.

17. The multilayer ceramic electronic component of claim 16, wherein an average content of Sn at an interface between the dielectric layer and the internal electrode is 5 at % or more.

18. The multilayer ceramic electronic component of claim 17, wherein an average content of Dy at an interface between the dielectric layer and the internal electrode is 5 at % or less.

19. The multilayer ceramic electronic component of claim 16, wherein a ratio (Sn/Dy) of a content of Sn to a content of Dy at an interface between the dielectric layer and the internal electrode satisfies a range of 2 or more.

20. A multilayer ceramic electronic component, comprising:
a ceramic body including a dielectric layer having a main component represented by $(Ba_{1-x}Ca_x)(Ti_{1-y}(Zr, Hf)_y)O_3$ (where, $0 \le x \le 1$, $0 \le y \le 0.5$), and including first and second internal electrodes alternately stacked with the dielectric layer interposed therebetween;
a first external electrode connected to the first internal electrode; and
a second external electrode connected to the second internal electrode,
wherein the internal electrode comprises Dy, an average content of Dy in the internal electrode is within a range of 0.025 at % or more and 1 at % or less,
wherein region with maximum content Dy is arranged at the interface of the dielectric layer and the internal electrode.

21. The multilayer ceramic electronic component of claim 20, wherein an average content of Dy at an interface between the dielectric layer and the internal electrode is 1 at % or more.

22. The multilayer ceramic electronic component of claim 21, wherein at least one of the dielectric layer and the internal electrode comprises Sn,
wherein an average content of Sn at an interface between the dielectric layer and the internal electrode is 20 at % or less.

23. The multilayer ceramic electronic component of claim 20, wherein an average thickness of an interface between the dielectric layer and the internal electrode is within a range of 2 nm or more and 4 nm or less.

24. The multilayer ceramic electronic component of claim 20, wherein the dielectric layer has an average thickness of 0.5 μm or less.

25. The multilayer ceramic electronic component of claim 20, wherein at least one of the first internal electrode and the second internal electrode has an average thickness of 0.4 μm or less.

* * * * *